United States Patent [19]
Klebl et al.

[11] 3,894,675
[45] July 15, 1975

[54] METHOD AND APPARATUS FOR MAKING COPPER CLAD STEEL WIRE

[75] Inventors: Wolfram Klebl, Isernhagen; Friedrich Schatz; Harry Staschewski, both of Langenhagen; Gerhard Ziemek, Hannover, all of Germany

[73] Assignee: Kabel-und Metallwerke Gutehoffnungshuette AG, Hannover, Germany

[22] Filed: Oct. 3, 1974

[21] Appl. No.: 511,517

[30] Foreign Application Priority Data
Jan. 24, 1974 Germany............................ 2403260

[52] U.S. Cl.................... 228/130; 219/61; 228/16; 228/238; 228/156; 228/175; 228/193; 228/205
[51] Int. Cl............................................. B21d 39/04
[58] Field of Search .... 29/473.5, 488, 473.3, 473.9, 29/474.1, 474.3, 475, 477, 477.3, 477.7, 505, 508; 228/15, 16, 17

[56] References Cited
UNITED STATES PATENTS
3,648,356   3/1972   Ziemak.............................. 29/474.1
3,807,301   4/1974   Jachimowicz..................... 29/474.1

Primary Examiner—Al Lawrence Smith
Assistant Examiner—Margaret M. Joyce

[57] ABSTRACT

Copper clad steel wire is continuously produced by forming a copper sheet into a tube around the wire and welding the copper tube, at the edges, to produce a longitudinal seam. The diameter of the welded copper tube is reduced to the diameter of the wire, and the composite heated to a temperature of at least 850°C, at which temperature the cross sectional area of the composite wire is reduced by at least 10 percent to bond the copper to the steel wire.

12 Claims, 1 Drawing Figure

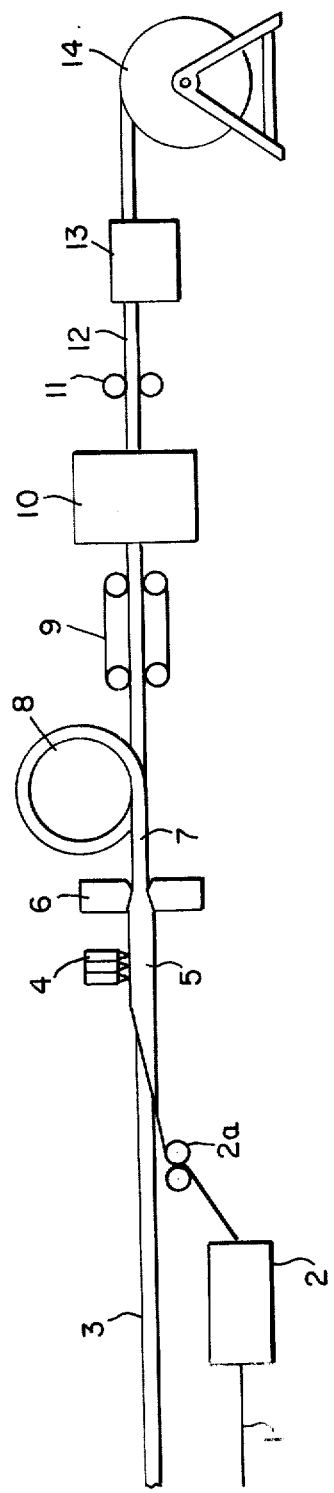

METHOD AND APPARATUS FOR MAKING COPPER CLAD STEEL WIRE

This invention relates to the production of copper clad steel wire, and more particularly, to a new and improved process for producing copper clad steel wire.

A method for making copper clad steel wire is already known, wherein the steel wire is continuously sheathed with a copper strip which is welded at its edges. In the welding, the copper strip is heated and in one roller process the strip edges are firmly pressed against each other, so that a furr is formed, while simultaneously pressing the copper strip onto the core. (Austrian Pat. No. 122,897). In practice, however, this method is difficult to carry out, since the temperature of the sheathed copper strip must be constantly maintained. Hence, mistakes which are made during the welding are discovered during the subsequent drawing off of the composite wire. Furthermore, the difficulty in maintaining the temperature prevents the obtaining of a rigid metallic bonding between the steel wire and the copper strip.

The principal object of the present invention is to provide a new and improved process for producing copper clad steel wire.

In accordance with the present invention, a rigid bond between a copper sheath and a steel wire core is provided by heating copper sheathed steel wire, with the copper sheath in contact with the steel wire, to a temperature of at least 850°C, followed by reducing the cross sectional area of the heated (a temperature of at least 850°C) sheathed wire, by at least 10 percent to provide a tight bond between the copper sheath and steel wire. The tight bond is provided by a diffusion layer created by the reduction at the stated temperature, and the connection is of sufficient strength that a continuous copper clad steel wire is produced which, if desired, can be further processed.

In accordance with one aspect of the present invention, the copper clad steel wire is produced in a continuous operation by passing a copper strip and steel wire through: (1) a forming station wherein the copper strip is formed into a tube having an inner diameter larger than the outer diameter of the wire; (2) a welding station wherein the tubular copper strip is welded, at its edges, to provide a longitudinal seam; (3) a first reducing station wherein the diameter of the copper tube is reduced to the diameter of the steel wire, whereby the copper tube is snugly mounted, in contact, with the steel wire; (4) a heating station wherein the sheathed wire (composite) is heated to a temperature of at least 850°C; and (5) a second reducing station wherein the cross sectional area of the sheathed wire is reduced by at least 10 percent to produce a tight bond between the copper sheath and steel wire.

The surfaces of the copper and steel to be bonded to each other are generally thoroughly cleaned to free the surfaces of oxides and thereby insure formation of the diffusion layer for providing tight bonding. The steel wire is scoured, neutralized and dried prior to sheathing thereof. It is also possible to peel the steel wire with rotating knives before sheathing. A further possibility is to sandblast the steel wire or treat it with scraping brushes. The copper strip may also be scoured, neutralized and dried before sheathing. However, it is preferred to treat the surface of the copper strip opposite the steel wire with brushes under inert gas before sheathing, so that all impurities and oxides are completely removed, while simultaneously obtaining a roughing of the copper surface. Due to the roughened enlarged surface, the diffusion layer is favorably influenced.

The composite wire is preferably heated to a temperature of at least 850°C by continuously passing the composite through a heating means; such as a resistance or induction heating oven or annealing device. The cross-sectional area of the heated composite wire is preferably reduced by at least 10 percent, immediately beyond the oven, by a combined rolling and drawing operation; e.g., by use of a driven Turk's head. Furthermore, it is also advantageous to cool the composite wire, after the diameter reduction; for example, in a water bath, whereby, the rapidly cooling copper sheath shrinks onto the steel wire. In order to obtain a particularly smooth surface of the composite wire, it is advantageous to smooth the wire in a drawing die, subsequent to the treatment by the Turk's head.

The copper clad steel wire which is made in accordance with the present invention has such a strong bond between the steel and copper that it can be drawn off to the desired diameter, for example, by a multi-step drawing and, if need be, with an intermediary annealing, without adverse effects.

The invention will now be described in detail with respect to an embodiment schematically shown in the appended drawing. It is to be understood, however, that the scope of the invention is not to be limited thereby.

A copper strip 1 is fed from a supply coil (not shown), cleaned in a degreasing device (not shown) and fed to a brushing device 2 wherein the face opposite steel wire 3 is cleansed from oxide and roughened by rotating metal brushes. The prepared copper strip 1 is continuously fed through a forming station 2a wherein the strip 1 is formed into a tube around steel wire 3, with the inner diameter of the copper tube being larger than the diameter of steel wire 3. Care should be taken that the steel wire 3 is spaced from the top of the formed tube, so that the welding process is not intefered with by the steel wire.

The steel wire and copper tube are fed through a welding station wherein the edges of the copper tube are connected to each other to form a longitudinal seam by means of an electric arc welding device 4, which preferably should consist of three individual electrodes switched in series with respect to each other. In order to prevent oxidation of copper strip 1, at its roughened surface, the strip is brushed under inert gas and is also welded under inert gas, if so desired.

The path between brush device 2 and welding device 4 is also covered with inert gas.

Immediately after welding, the copper tube 5 and steel wires are passed through a first reducing station, including a drawing device 6, wherein the inside diameter of the copper tube is reduced to the diameter of the steel wire 3 whereby the copper tube is in contact with and snugly mounted on the steel wire 3. In the drawing device 6, the diameter of the steel wire 3 may also be reduced.

The surface of steel wire 3 may be cleaned in line while being fed into the copper tube or in a separate step, and if so desired, roughened. The sheathed steel wire 7 is drawn through drawing device 6 by means of device 8, preferably a disk draw 8 whereby one or a plurality of windings of the sheathed wire 7 are fed around disk draw 8. The disk draw 8 provides a constant drawing off speed. Therefore, it is required that the windings of the sheathed wire 7 are in engagement with the surface of disk draw 8. For this purpose, a draw off device 9 is provided which keeps the sheathed wire under constant tension beyond drawing device 6. At this moment no substantial bond exists between the steel wire and the copper strip 1.

The sheathed wire 7 is then fed through a heating or annealing station 10 which may include a resistor throughput annealing device or an induction annealing means, wherein the sheathed or composite wire is heated to a temperature of at least 850°C.

The sheathed wire is then passed through a second reducing station, which preferably includes a Turk's head 11, wherein the cross-sectional area of the composite wire 7 is reduced by at least 10 percent, preferably, by about 20 percent. The Turk's head 11, essentially consists of at least four diametrically arranged rollers, which in their outer circumference are so profiled that a circle is formed the diameter of which corresponds to the diameter of reduced wire 12 and the Turk's head rollers are preferably driven. In this rolling-drawing reduction, at a temperature of at least 850°C, the copper strip 1 is firmly pressed against steel wire 3, thus forming a low diffusion layer, which assures a rigid connection between copper strip 1 and steel wire 3.

The cross-sectional area reduction in the second reduction station beyond heating station 10 may also be accomplished by a normal draw die, whereby a lubricating medium is used which is highly heat resistant, for example, glass powder.

After the cross diameter reduction, the composite wire 12 is fed through a cooling station 13, for example, containing a water bath wherein the heated composite wire is rapidly cooled. The cooled composite wire is then wound onto a storage drum 14. The composite wire 12 may be further reduced in diameter in a plurality of drawing steps, and if required, with intermediate annealing.

The present invention is particularly advantageous in that copper clad steel wire can be produced in unlimited lengths, with a flawless, rigid bond between the copper and steel. In addition, the wire may be continuously made in an uncomplicated and economical manner. Due to the exact strip thickness, the concentricity of the copper layer provides a product of high quality. The output depends on the starting diameter of the steel wires and usually for diameters in the range of about 8mm to 16mm, the output is 0.7 to 3.0 tons per hour, depending on the desired copper layer.

Numerous modifications and variations of the present invention are possible in light of the above teachings and, therefore, within the scope of the appended claims the invention may be practiced otherwise than as particularly described.

What is claimed is:

1. A process for producing copper clad steel wire, comprising:
   heating steel wire sheathed with copper to a temperature of at least 850°C, said copper sheath being in contact with the steel wire; and
   reducing the cross sectional area of the copper sheathed steel wire by at least 10 percent at a temperature of at least 850°C to produce a tight bond between the copper sheath and steel wire.

2. The process of claim 1 wherein the cross sectional area is reduced by combined rolling and drawing.

3. The process of claim 1 wherein the wire is rapidly cooled subsequent to the reduction.

4. A continuous process for producing copper clad steel wire, comprising:
   passing a copper sheet and a steel wire through a forming station and forming the copper sheath into a tube around the steel wire, said copper tube having an inside diameter larger than the outside diameter of the steel wire;
   passing the copper tube and steel wire through a welding station and welding the copper tube, at its edges, to provide a longitudinal seam;
   passing the welded copper tube and steel wire through a first reducing station and reducing the diameter of the copper tube to the diameter of the steel wire to effect contact between the copper tube and the steel wire and produce a composite wire;
   passing the composite wire through a heating station and heating the composite wire to a temperature of at least 850°C; and
   passing the heated composite wire through a second reducing station and reducing the cross sectional area of the composite wire by at least 10 percent, said composite wire being reduced at a temperature of at least 850°C to produce a tight bond between the copper tube and steel wire and produce copper clad steel wire.

5. The process of claim 4 wherein the cross sectional area of the composite wire is reduced by a combined rolling and drawing operation.

6. The process of claim 5 wherein the reduced composite wire is passed through a cooling station and is rapidly cooled subsequent to said reduction in cross sectional area.

7. The process of claim 4 wherein the diameter of the copper tube is reduced to the diameter of the steel wire by drawing.

8. The process of claim 6 wherein the copper is welded by electrical arc welding.

9. The process of claim 6 wherein the steel wire and copper sheet are scoured, neutralized and dried to provide oxide free surfaces prior to production of the composite wire.

10. The process of claim 4 wherein the cross sectional area of the composite wire is reduced by drawing.

11. An apparatus for producing copper clad steel wire, comprising:
   a forming station for forming a copper tube around a steel wire;
   a welding station for welding the edges of the copper tube to produce a longitudinal seam;
   a first reducing station for reducing the diameter of the copper tube to the diameter of the steel wire and produce a composite wire;
   a heating station to heat the composite wire to a temperature of at least 850°C;
   a second reducing station to reduce the cross sectional area of the composite wire by at least 10 percent and produce a tight bond between the copper and steel wire; and
   means for continuously and sequentially passing the copper and steel wire through the forming station, welding station, first reducing station, heating station and second reducing station.

12. The apparatus of claim 11 wherein the second reducing station comprises a Turk's head.

* * * * *